G. H. WALLACE.
ATTACHMENT FOR BAND SAWS.
APPLICATION FILED DEC. 9, 1918.

1,360,604.

Patented Nov. 30, 1920.

Inventor:
George H. Wallace,
by his attorney, Charles N. Gooding.

UNITED STATES PATENT OFFICE.

GEORGE H. WALLACE, OF CAMBRIDGE, MASSACHUSETTS.

ATTACHMENT FOR BAND-SAWS.

1,360,604.　　　　　Specification of Letters Patent.　　Patented Nov. 30, 1920.

Application filed December 9, 1918. Serial No. 265,814.

*To all whom it may concern:*

Be it known that I, GEORGE H. WALLACE, a citizen of the United States, residing at Cambridge, in the county of Middlesex and State of Massachusetts, have invented new and useful Improvements in Attachments for Band-Saws, of which the following is a specification.

This invention relates to an attachment for band saw machines.

In using band saw machines, it has been customary, especially if the piece to be cut out is of irregular form, to first mark out the desired finished shape upon the piece of wood to be sawed and to then cut the piece out by the pattern marked thereon. In other cases where irregular shaped pieces are to be produced, the work is first marked out on the piece of wood to be cut and the piece is then cut out to finished shape by a molding machine.

It is the object of this invention to provide an attachment for a band saw machine which eliminates the work of laying out the pattern on the wood and of cutting out the finished piece on a molding machine, the work being done directly by the band saw machine and thus saving a large amount of time and expense.

The invention consists of an attachment for a band saw machine as hereinafter described and particularly as pointed out in the claims.

Referring to the drawings.

Like numerals refer to like parts throughout the several views of the drawings.

Figure 1:
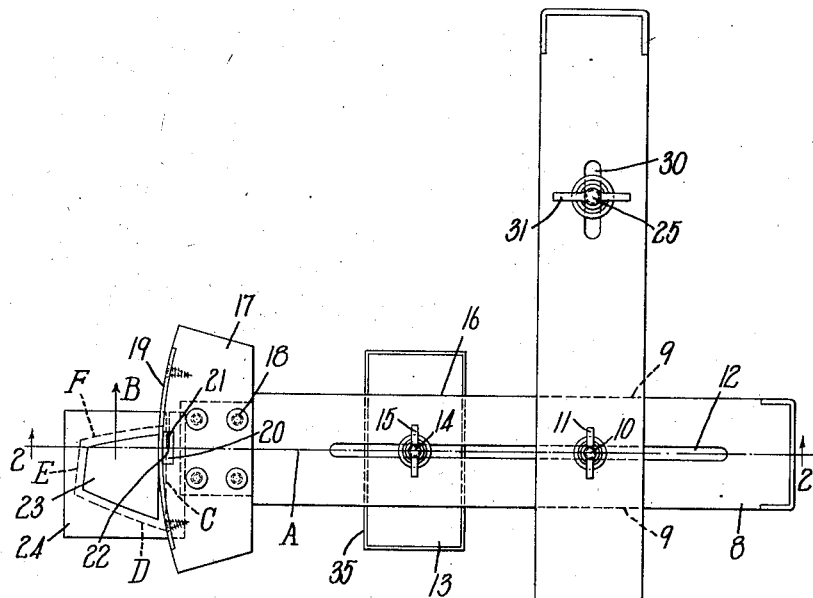
Figure 1 is a plan view of my improved attachment for a band saw machine.
Figure 3:
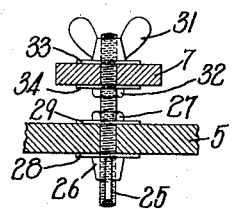
Fig. 3 is a transverse sectional elevation taken on line 3—3 of Fig. 1.
Figure 2:
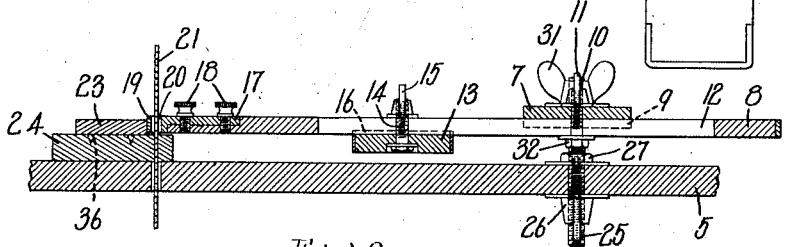
Fig. 2 is a sectional elevation taken on line 2—2 of Fig. 1.

In the drawings, 5 is a portion of the table of a band saw machine and 6 is a guide frame embodying my invention and consisting of a member 7 and another member 8 slidable transversely of the member 7 in a guideway 9 provided in said member 7 and extending transversely thereacross at right angles thereto.

The member 8 is clamped to the member 7 by a clamp-bolt 10 and thumb-nut 11. The member 8 is provided with a slot 12 extending longitudinally thereof through which the bolt 10 projects, so that by loosening the thumb-nut 11 the member 8 can be slid along transversely of and upon the member 7 in the guideway 9 to any desired position and then clamped firmly thereto by tightening the thumb-nut 11. In order to render the device light and cheap to manufacture the members 7 and 8 are preferably formed of flat strips of material.

A guide member 13 is adjustably fastened to the member 8 by a bolt 14 and thumb-nut 15, said guide member 13 being provided with a guideway 16 into which the guide member 8 fits. The bolt 14 projects through the slot 12, so that by loosening the thumb-nut 15 the guide member 13 may be moved longitudinally of the member 8 and always be held at right angles thereto on account of the member 8 fitting in the guideway 16, and when said guide member has been moved to the desired position, it may be clamped firmly in position upon the member 8 by tightening the thumb-nut 15. This guide member is used where straight work is being cut out of material.

Upon the outer end of the member 8 a guide block 17 is fastened, said block 17 being detachably fastened thereto by means of thumb-screws 18. Said block has a convexly curved guide plate 19 fastened thereto which extends across one edge of a notch 20, said notch 20 and guide plate 19 forming a closed slot through which the band saw 21 passes. The cutting edge 22 of the band saw is preferably in alinement with the center line A of the member 8.

A templet 23 is fastened to a piece of material 24 out of which the finished piece is to be cut.

The guide frame, as a whole, can be raised and lowered to accommodate different thicknesses of material to be cut by means of screw-threaded studs 25 which are clamped to the band saw table by nuts 26 and 27 and collars 28 and 29. Said screw-threaded studs 25 extend through slots 30 in the member 7 and said member 7 is clamped to the studs 25 by means of nuts 31 and 32 and collars 33 and 34. These studs 25 thus constitute standards or supports projecting upwardly from the band saw table upon which the guide frame 6 is supported. By adjusting the nuts 31 and 32 upwardly or downwardly upon the studs 25, the distance between the guide frame member 8 and the top of the table may be varied to accommodate different thicknesses of material to be cut.

The general operation of the device hereinbefore specifically described is as follows: The member 7, together with the parts supported thereon, is fastened to the work table 5 of the band saw machine by means of the studs 25 and nuts 26 and 27 and collars 28 and 29. If it is desired to adjust the guide frame vertically to make a greater or less space between the guide frame and the top of the table 6, this is accomplished by means of the nuts 31 and 32 upon the studs 25.

The guide member 13 may be adjusted upon the guide member 8 to bring the guiding front edge thereof nearer to or farther from the saw by means of the bolt 14 and thumb nut 15. The member 8, together with the guide member 13, and the guide block 17, can be moved toward or away from the member 7 by means of the bolt 10 and thumb nut 11.

The guide frame, as a whole, can be moved laterally of the saw 21, in order to accommodate different widths of saws and still have the cutting edge of the saw in alinement with the center line A of the member 8, by loosening the nuts 31 and moving the member 7 longitudinally thereof, at which time the studs 25 will move in the slots 30, and then clamping the members together again by tightening the thumb-screws 31.

In making a straight cut in a piece of material, the material is placed upon the work table beneath the member 8 and against the front edge 35 of the guide member 13 and the piece pushed forward against the band saw 21 in the usual manner.

If it is desired to cut small pieces of irregular outline, the piece of material 24, from which the desired object is to be cut, has a templet 23 attached thereto which is of the contour of the piece to be cut, less the distance from the front edge of the guide plate 19 to the front edge of the saw 21. The piece 24, with the templet 23, is then placed upon the band saw work table 5 and moved up against the cutting edge of the saw, with the inner edge of the templet 23 bearing against the plate 19 in alinement with the front edge of the saw. The piece is then moved along in the direction of the arrow B by the operator until one side of the object to be produced is cut, as indicated by the dotted line C. The other sides, D, E and F, indicated by dotted lines, Fig. 1, are then cut in the same manner. The templet is then removed from the piece 24 to which it is attached temporarily during the operation hereinbefore described by pins 36 and the operation hereinbefore described is repeated with the same templet to produce another like shaped article.

By the use of this attachment for a band saw very accurate work may be obtained with great speed.

The guide plate 19 is made convexly curved because by such a form the piece to be sawed can have a straight edge, a convexly curved edge or a concavely curved edge without necessitating any change of the guide plate.

Having thus specifically described my invention, what I claim and desire by Letters Patent to secure is:

1. An attachment for band saw machines having, in combination, a guide frame provided with a slot with four walls for a band saw, means to fasten said frame to the work-table of said band saw machine, a guide for a piece of wood on said frame and forming one of said walls, and means to adjust said guide frame laterally with relation to said band saw.

2. An attachment for band saw machines having, in combination, a frame, means to fasten said frame to the work-table of a band saw, a guide plate detachably fastened to said frame and comprising a block provided with a notch in one edge thereof to permit the passage of a band saw therethrough and a plate fastened to said block extending across said notch and constituting a guide member for a piece of material to position the same to be cut by said saw.

3. An attachment for band saw machines having, in combination, a frame, means to fasten said frame to the work-table of a band saw, a guide plate detachably fastened to said frame and comprising a block provided with a notch in one edge thereof to permit the passage of a band saw therethrough and a convexly curved plate fastened to said block extending across said notch and constituting a guide member for a piece of material to position the same to be cut by said saw.

4. An attachment for band saw machines having, in combination, a guide frame consisting of two flat strips, one slidable upon the other in a direction at right angles thereto, means to clamp said slidable strip to the other strip, means to clamp said frame to the work-table of said band saw machine at varying distances thereabove and a guide for a piece of material adjustably fastened to said first named strip.

5. An attachment for band saw machines having, in combination, a guide frame consisting of two flat strips, one slidable upon the other in a direction at right angles thereto, means to clamp said slidable strip to the other strip, means to clamp said frame to the work-table of said band saw machine, said first named strip being provided with a slot in one end thereof to enable a band saw to pass therethrough, one edge of said first named strip adjacent to said slot being adapted to guide a piece of material to position the same to be cut by said saw.

In testimony whereof I have hereunto set my hand in presence of two subscribing witnesses.

GEORGE H. WALLACE.

Witnesses:
 CHARLES S. GOODING,
 FRANKLIN E. LOW.